United States Patent [19]

Dubowik

[11] Patent Number: 4,765,030

[45] Date of Patent: Aug. 23, 1988

[54] METHOD FOR REMOVING SKIN FROM FISH AND FOWL

[75] Inventor: John M. Dubowik, Nashua, N.H.

[73] Assignee: Foster-Miller, Inc., Waltham, Mass.

[21] Appl. No.: 72,631

[22] Filed: Jul. 13, 1987

[51] Int. Cl.$^4$ .............................................. A22C 25/17
[52] U.S. Cl. ............................................ 17/50; 17/62
[58] Field of Search ................................. 17/50, 21, 62

[56] References Cited

U.S. PATENT DOCUMENTS

| | | | |
|---|---|---|---|
| 2,787,549 | 4/1957 | Heald .................................. | 17/50 X |
| 4,020,528 | 5/1977 | Lindbladh et al. ...................... | 17/50 |
| 4,500,555 | 2/1985 | Chu ...................................... | 17/50 X |

*Primary Examiner*—Willie G. Abercrombie
*Attorney, Agent, or Firm*—Herbert L. Bello

[57] ABSTRACT

In a method for removing skin from fish and fowl, the fish and fowl are exposed to intense heat for a short duration. The heat is sufficiently intense to destroy the bond between the skin and underlying flesh without significantly affecting the underlying flesh. The high temperature is removed and the skin is refrozen. The fish or fowl is carried to a skinning station where a high velocity spray, which is directed at the skin, rapidly separates the skin from the underlying flesh without removing the flesh.

16 Claims, 2 Drawing Sheets

METHOD FOR REMOVING SKIN FROM FISH AND FOWL

BACKGROUND OF THE INVENTION

1. Field of Invention

The present invention relates to processing of fish and fowl and, more particularly, is directed toward a method for removing skin from fish and poultry.

2. Description of the Prior Art

A variety of systems have been developed for removing skin from fish and fowl. The aim of such systems is to remove the skin without removing the underlying flesh. In one method for skinning frozen tuna fish, the tuna are thawed first, then they are placed in cookers and precooked for approximately one to three hours, the length of cooking time is determined by the size of the fish. When the precooking has been completed, the tuna are allowed to cool. The surface dries, and the skin, loosened from the flesh during cooking, reattaches to the flesh. After cooling, the tuna are moved into a cleaning room where the skin, bones, fins, and blood meat, are separated from the light loin meat. The heads, tails, and fins are first removed and then the skin is scraped off.

Another method of skinning fish involves placing fish fillets skin side up on a conveyor belt which passes under a rotating refrigerated, stainless steel drum. When the fish skin contacts the refrigerated drum surface, it is frozen to the drum. The skin and flesh are separated by means of a continuous knife blade.

Prior art methods of skinning fish and fowl suffer from the disadvantage that a thin layer of meaty flesh is removed with the skin. A need has arisen for an improved method for skinning fish and fowl in which the skin is removed without removing the underlying meaty flesh.

SUMMARY OF THE INVENTION

An object of the present invention is to provide an improved method for removing skin from fish and fowl.

Another object of the present invention is to provide a method of separating the skin of fish from the underlying muscle tissue or meaty flesh without removing the flesh. The method of skinning a fish according to the present invention includes the steps of exposing a frozen fish to intense heat for a brief period of time, in the order of one minute or less, so that the temperature of the skin is elevated rapidly without significantly affecting the temperature of the underlying meaty flesh. Next, the fish is removed from the high temperature environment and refrozen. The intense heat and subsequent freezing cause the fish skin to dehydrate, shrink and rupture. Then, the fish is transported to a skin removing station where high velocity sprays are directed at the frozen fish. The high velocity spray rapidly removes the skin without removing the underlying flesh. Once the skin has been removed, the fish is ready for further processing.

A further object of the present invention is to provide a method of separating the skin of fowl from the underlying flesh without removing the flesh. The method of the present invention includes the steps of exposing a frozen fowl to intense heat for a brief period of time, in the order of one minute or less, so that the temperature of the skin is elevated without significantly affecting the temperature of the underlying flesh. Next, the fowl is removed from the high temperature environment and refrozen. Then, the fowl is transported to a skin removing station where high velocity sprays are directed at the frozen fowl. The high velocity spray removes the skin without removing the underlying flesh. Once the skin has been removed, the fish is ready for further processing.

Other objects of the present invention will in part be obvious and will in part appear hereinafter.

The invention accordingly comprises the processes, together with their steps, elements and interrelationships that are exemplified in the following disclosure, the scope of which will be indicated in the appended claims.

BRIEF DESCRIPTION OF THE DRAWINGS

A fuller understanding of the nature and objects of the present invention will become apparent upon consideration of the following detailed description taken in connection with the accompanying drawings, wherein.

DETAILED DESCRIPTION OF THE PREFERRED EMBODIMENTS

Figure 1:
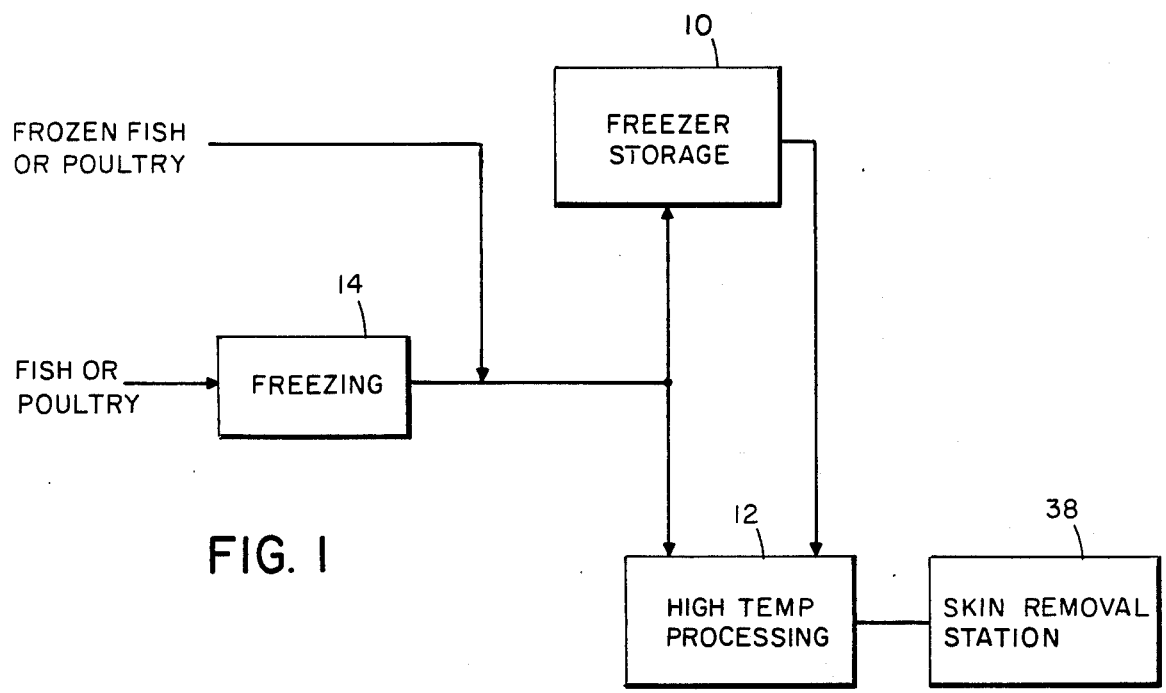
FIG. 1 is a schematic diagram showing the method steps for processing either fish or fowl according to the present invention.

Referring now to the drawings, particularly FIG. 1, there is shown a schematic diagram illustrating the method steps for processing fish and fowl according to the present invention. The method for removing skin according to the present invention comprises the step of exposing the skin of a frozen fish or fowl to intense heat for a short duration period of time. If the fish or fowl is not frozen, then it is frozen prior to being exposed to the high temperature. As hereinafter noted, the intensity of the heat and the exposure period are such that only the temperature of the skin rises and the temperature of the underlying flesh or muscle tissue remains substantially unchanged. The intensity of the heat is sufficiently great to destroy the bond holding the skin to the underlying flesh. Although there may be some superficial heating of the underlying flesh, the bulk of the flesh remains in a frozen state. Upon removal of the high temperature and completion of the high temperature precessing, the skin is refrozen either actively or passively. Next, a high velocity spray is directed at the fish or fowl, whereby the outer skin is rapidly separated from the underlying frozen flesh. The skin removing process of the present invention is applicable to fish and fowl which are initially frozen at temperatures less than or equal to approximately 15° F.

As shown in FIG. 1, if the fish or fowl are received in a frozen state, they are sent to either a freezer 10 for storage and later processing or a high temperature processing unit 12. If the fish or fowl are not frozen, they are sent to a freezing station 14 where they are flash frozen or place in a freezer until they are frozen. Once the fish or fowl are in a frozen state, they are sent from the freezing station 14 to either the freezer storage unit 10 or the high temperature processing unit 12. Although FIGS. 2, 3 and 4 and the following description refer to processing of fish, it is to be understood that the same processing is applicable to fowl.

Figure 2:
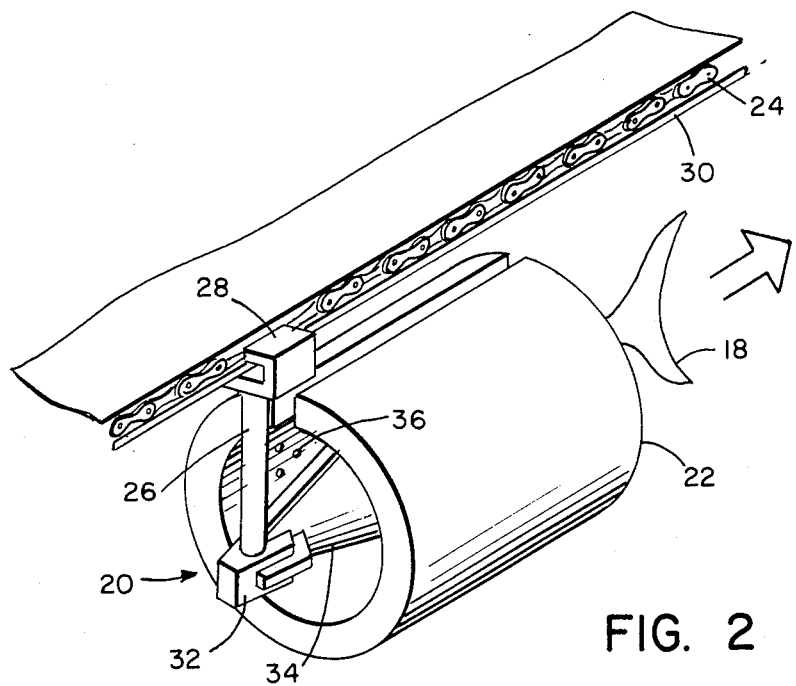
FIG. 2 is a schematic diagram illustrating the high temperature processing of fish.

Referring now to FIG. 2, there is shown high temperature processing of a fish 18 which is carried on a conveyor assembly 20 through a heating element 22. Conveyor assembly 20 includes an endless belt 24, for example a chain, which travels about a track 30. A rod 26 extends downwardly from a dolly 28 that is carried by chain 24 along track 30. Rod 26 is fitted with a fish supporting carrier 32 having a cone-shaped fixture 34 that is configured to receive and hold the fish 18 by its head. In the illustrated embodiment, by way of example, heating element 22 is provided with a plurality of open flame jets 36 which are disposed about the interior surface of the heating element 22. Each fish 18 is exposed to the direct flame, for example natural gas flame, for a time period in the range of ten seconds to one minute. Heating element 22 provides intense dry heat in the temperature range of 750° F. to 1500° F., preferably 1000° F. to 1500° F. The temperature is sufficiently high to destroy the bonding between the skin and underlying flesh.

In another embodiment, high temperature processing is accomplished by means of high intensity infra-red radiant heating of the skin. This method of high temperature processing is intended to achieve a similar or higher level of heating in the skin and underlying flesh than previously described in order to destroy the bond between the skin and fleshy meat and dehydrate the skin. In one example, infra-red radiant heating is accomplished by means of gas-fired ceramic heating elements. The infra-red heat, which is in the range of 1000° F. to 1500° F., is applied by positioning the heating element surface in the range of one inch to twelve inches away from the skin of the fish for a time period in the range of five to sixty seconds. The intense heat causes dehydration of the skin and disruption of the underlying bond which holds the skin in place. Dehydration causes shrinking of the skin which destroys the integrity of the skin by shearing and fracturing of the skin.

Upon completion of the high temperature processing, the outside surface of the fish is refrozen. Surface refreezing is accomplished passively by conduction of skin heat into the underlying frozen flesh which is well below freezing temperature. Passive skin refreezing may take approximately five minutes to one hour. In an alternate embodiment, the refreezing process is accelerated by exposure to refrigerated air or by flash freezing in a nitrogen or carbon dioxide environment. Active skin refreezing is accomplished by positioning the fish in a circulating refrigerated air environment in the temperature range of approximately −20° F. to 0° F. or by exposing the fish to a flash freezing process. Refreezing of the skin may not be required or even helpful for certain types of fish and other process parameters. If so, the refreezing step is omitted and the fish is sent directly from the high temperature processing to a skin removing station 38.

In a further embodiment, high temperature processing is accomplished by conveying the fish through a heating and optional refreezing tunnel on stainless steel grid type conveyor belts. Other mechanical devices may also be used to ensure even heating and cooling of the fish skin, for example, conveyor rollers which are configured to turn over the fish as they advance through the high temperature and refreezing process. In any event, the fish are subjected to intense heat in the range of 1000° F. to 1500° F. for time periods of one minute or less for the purpose of causing dehydration and disruption of the bond holding the skin and underlying meat. Upon completion of the high temperature processing and refreezing steps, the fish are carried to the skin removing station 38. When the dehydrated skin refreezes, it is pliable and easily removed by water spray.

Figure 3:
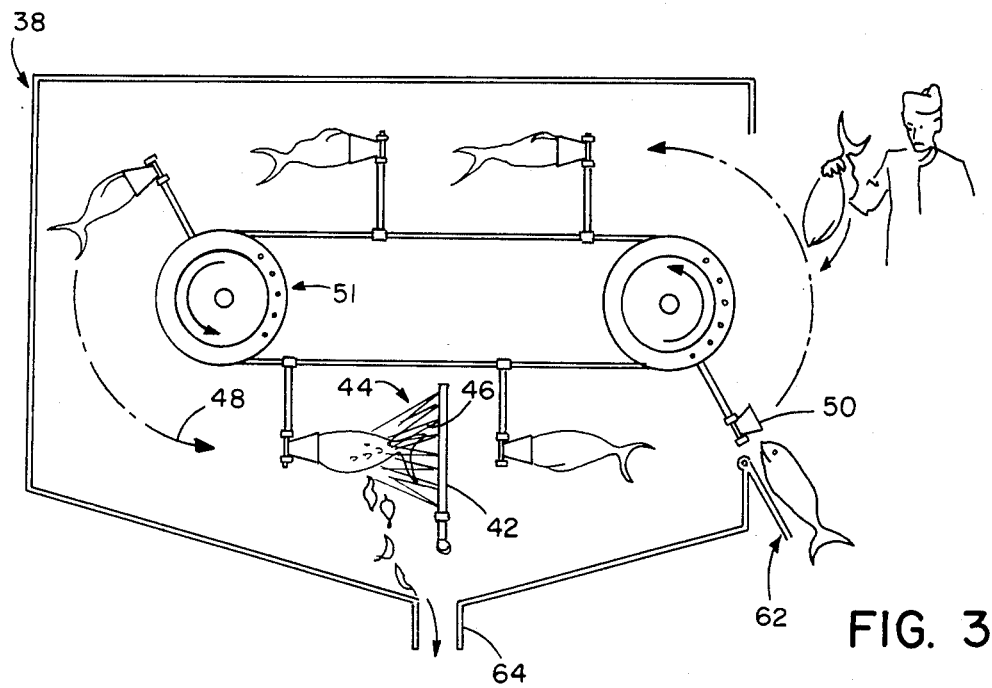
FIG. 3 is a schematic diagram showing the removing skin from fish.

Referring now to FIG. 3, there is shown the skin removing station 38 in which the fish 18 are conveyed through a manifold 42, for example a ring-shaped manifold, having a plurality of high velocity sprays 44 flowing out of nozzles 46. The high velocity sprays 44, for example high velocity water sprays having a velocity in the range of 1500 psi to 2500 psi, preferably 2150 psi, split, peel back and blow off the dehydrated and ruptured fish skin and expose the underlying frozen flesh. In one embodiment, individual water spray nozzles generate a fan-shaped spray pattern that is aimed toward the fish at shallow angles relative to the longitudinal axis of the fish. The fish 18 are moved relative to the spray nozzles 46 such that the water spray 44 impinges on the fish as they progress along the travel path shown by the arrow denoted by the reference character 48. Typical water temperatures are in the range of 45° F. to 120° F. The water pressure upstream of the spray nozzles 46 is in the range of 500 psi to 2500 psi. The spray angle relative to the longitudinal axis of the fish is in the range of 5° to 45°. The spray distance along the spray path is in the range of one half inch to four inches.

The water spary process parameters and the exact configuration of the multiple spray nozzle arrangement are set in order to obtain consistent skin removal while minimizing errosion of the underlying frozen meat, thereby minimizing the loss of meat during the skinning process. In the illustrated embodiment of FIG. 3, the heads of the fish 18 are manually placed into clamping devices 50 and the fish are conveyed past water spray nozzle manifold 42 by a transfer conveyor 51.

Figure 4:
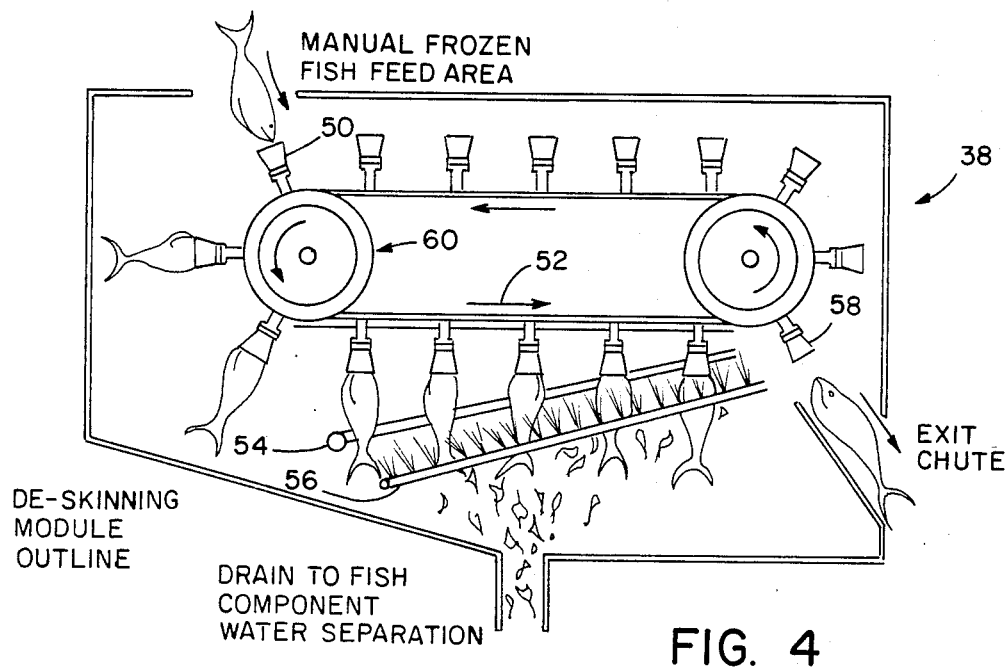
FIG. 4 is a schematic diagram showing an alternate embodiment of the skin removing process of FIG. 3.

In an alternate embodiment shown in FIG. 4, the skin is removed by progressively spraying the fish 18 from tail to head. The fish 18 are carried along a travel path 52 between two opposing line spray nozzle manifolds 54 and 56 which are in spaced parallel relationship to one another and at an angle relative to the travel path 52 of the fish. The heads of the fish are clamped in a clamping mechanism 58 which closes on the fish heads and the fish are transported along the travel path 52 to the spray nozzle manifolds 54 and 56 by a chain conveyor 60.

Upon completion of the skin removing process, the fish 18 are released from the head clamps 58 and exit the skin removing station 38 by a chute 62. The fish are then be conveyed to other stations for further processing and canning. The removed skin and other by-products fall through an exit chute 54.

In one example, tuna fish were placed in a freezer until frozen. The tuna having a weight in the range of five to seven pounds were removed from the freezer and exposed to intense heat of approximate 1450° F. from a gas fired radiant heater for approximately 15 to 20 seconds. Bubbling and/or boiling of the skin was observed during the heating process. The burnt skin was allowed to refreeze in the atmosphere for five minutes. The skin appeared to be dehydrated and split. Then, the fish were subjected to a cold water spray. A fan-spray nozzle with about a 20° divergence was used to direct a spray tangentially to the skin. The water temperature was approximately 50° F. and the flow rate was approximately 2150 psi. The water spray removed the skin from the frozen fish body without removing the underlying frozen flesh.

In another example, the skin was removed from fowl using the process of the present invention. In this example, raw eviscerated and defeathered large roasting chickens, in the range of 5 to 8 pounds, were place in a freezer ovenight and allowed to freeze solidly. The chickens were exposed to gas powered radiant heaters operating at an estimated 1450° F. for approximately 25 seconds. Then, the burnt skin surfaces were allowed to refreeze in the atomosphere for a period of five minutes. Next, the chickens were exposed to a water spray. Cold water, approximately 50° F. was directed onto the pretreated skin. A fan-spray nozzle with about a 20° divergence was used for directing the spray tangentially to the skin to be removed, the flow rate was approximately 2150 psi.

Very rapid removal of the skin was experienced with less skin fragmentation than experienced on frozen fish. Damage to the underlying flesh was minimal and seemed more forgiving with respect to angle and exposure time to the spray than the various types of fish previously tested. An apparent bubbling and/or boiling of the skin is the only disruptive force observed externally during the heating step. There is very little shrinkage and no splitting of the skin while being heat-treated. The skin does, however, lose its tensile strength and is very easily torn and split prior to being removed. It is uncertain if dehydration of the chicken skin occurs during this process.

Thinner fish skin fractures and becomes more frangible at a shorter exposure to heat than the chicken skin. Since the fish skin is less rubbery and thinner than the skin of fowl, a longer heat exposure period is required for fowl. Operationally, the only difference between removal of fish skin and removal of the skin from fowls appears to be the length of the heat exposure period. Fish can be processed in as little as fifteen seconds, while fowl requires approximately twenty-five seconds. The tests that were performed on frozen fish used heat exposure periods in the range from fifteen to thirty seconds. Little response was realized with the chicken at periods in the fifteen-second range.

Since certain changes may be made in the foregoing disclosure without departing from the scope of the invention herein involved, it is intended that all matter contained in the above description and depicted in the accompanying drawings be construed in an illustrative and not in a limiting sense.

What is claimed is:

1. A method of removing frozen skin from the underlying flesh of fish and fowl, said method comprising the steps of:
   (a) subjecting the frozen skin to intense heat in the range of 750° F. to 1500° F. for a time period in the range of five seconds to sixty seconds;
   (b) freezing the skin; and
   (c) directing a high velocity fluid spray at the frozen skin and removing the skin from the underlying flesh.

2. The method as claimed in claim 1 wherein the skin is subjected to a temperature in the range of 1000° F. to 1500° F.

3. The method as claimed in claim 2 wherein the skin is subjected to a temperature in the range of 1400° F. to 1500° F.

4. The method as claimed in claim 3 wherein said time period is in the range of ten seconds to thirty seconds.

5. The method as claimed in claim 1 wherein the velocity of the fluid spray is in the range of 1500 psi to 2500 psi.

6. The method as claimed in claim 1 wherein the velocity of the fluid is in the range of 2100 psi to 2200 psi.

7. A method of removing skin from the underlying flesh of fish or fowl, said method comprising the steps of:
   (a) freezing the fish or fowl from which the skin is to be removed;
   (b) exposing the frozen fish or fowl to intense heat in the range of 750° F. to 1500° F. for a time period in the range of five seconds to sixty seconds, the bulk of the flesh remaining in a frozen state; and
   (c) directing a high velocity spray at the skin and removing the skin from the fish or fowl by means of said high velocity spray.

8. The method as claimed in claim 7 including the step of refreezing the skin after the heating step and before the spraying step.

9. The method as claimed in claim 8 wherein said high velocity spray is generated by a ring-shaped manifold with a plurality of high velocity nozzles, the velocity of the spray being in the range of 1500 psi to 2500 psi.

10. A method of removing skin from fish or fowl said method comprising the steps of:
    (a) freezing the fish or fowl;
    (b) exposing the frozen fish or fowl to intense heat in the range of 1000° F. to 1500° F. for heating the skin and destroying the bond between the skin and underlying flesh while maintaining the bulk of the flesh in a frozen state;
    (c) removing the fish or fowl from the intense heat and refreezing the fish and fowl; and
    (d) directing a high velocity spray at the refrozen fish or fowl and removing the skin by means of said high velocity spray.

11. The method as claimed in claim 10 wherein said step of exposing the fish or fowl to a high heat includes the step of exposing the fish or fowl to radiant heating in the range of 1250° F. to 1500° F.

12. The method as claimed in claim 11 wherein the fish or fowl is exposed to open radiant flame heating.

13. The method as claimed in claim 11 wherein the fish or fowl is exposed to high intensity infra-red radiant heating.

14. The method as claimed in claim 10 wherein the step of exposing the fish or fowl to intense heat includes generating infra-red radiant heating from a source which is spaced one to twelve inches from the skin of the fish or fowl for a period of time in the range of ten seconds to sixty seconds.

15. A method of separating the skin of a fish from the underlying flesh comprising the steps of:
    (a) exposing a frozen fish to intense heat for a short period of time, said heat being sufficiently high and said time period being sufficiently short to destroy the bond between the skin and underlying flesh while the bulk of the underlying flesh remains frozen;
    (b) removing the fish from the intense heat;
    (c) freezing the skin; and
    (d) directing a high velocity spray at the frozen fish skin and separating the skin from the underlying flesh by means of said high velocity spray.

16. A method of separating the skin of a fowl from the underlying flesh comprising the steps of:

(a) exposing a frozen fowl to intense heat for a short period of time, said heat being sufficiently high and said time period being sufficiently short to destroy the bond between the skin and flesh while the bulk of the underlying flesh remains frozen;
(b) removing the fowl from the intense heat;
(c) freezing the skin; and
(d) directing a high velocity spray at the frozen skin of the fowl and separating the skin from the underlying flesh by means of said high velocity spray.

* * * * *